(12) United States Patent
Batista et al.

(10) Patent No.: US 10,774,954 B2
(45) Date of Patent: Sep. 15, 2020

(54) FLUID SUPPLY CONDUIT AND METHOD FOR PROVIDING SUCH A CONDUIT

(71) Applicant: SAFRAN AIRCRAFT ENGINES, Paris (FR)

(72) Inventors: Edgar Batista, Moissy-Cramayel (FR); Nelson Caetano, Moissy-Cramayel (FR); Lore Marie Ricquemaque, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 95 days.

(21) Appl. No.: 16/212,028

(22) Filed: Dec. 6, 2018

(65) Prior Publication Data
US 2019/0178422 A1    Jun. 13, 2019

(30) Foreign Application Priority Data
Dec. 7, 2017    (FR) .................................... 17 61742

(51) Int. Cl.
| | |
|---|---|
| *F16L 9/04* | (2006.01) |
| *F02C 7/22* | (2006.01) |
| *F01D 9/06* | (2006.01) |
| *F16L 9/00* | (2006.01) |
| *F01D 5/00* | (2006.01) |
| *B21D 22/02* | (2006.01) |
| *B23K 101/08* | (2006.01) |
| *B21D 53/92* | (2006.01) |

(52) U.S. Cl.
CPC ................ *F16L 9/047* (2013.01); *F01D 5/00* (2013.01); *F01D 9/06* (2013.01); *F02C 7/222* (2013.01); *F16L 9/006* (2013.01); *F16L 9/04* (2013.01); *B21D 22/025* (2013.01); *B21D 53/92* (2013.01); *B23K 2101/08* (2018.08); *F05D 2260/60* (2013.01); *F16L 2201/40* (2013.01)

(58) Field of Classification Search
CPC ..... F16L 9/04; F16L 9/047; F16L 9/06; F16L 2201/40; F01D 5/00; F01D 5/027
USPC ................ 138/172, 173, 177, 178, 121, 110
See application file for complete search history.

(56) References Cited

U.S. PATENT DOCUMENTS 7,493,892 B1 *   2/2009  Sims, Jr. .............. F02M 55/025
                                                        123/456

FOREIGN PATENT DOCUMENTS

| DE | 251 867 C | 11/1911 |
|---|---|---|
| DE | 20 2005 005056 U1 | 6/2005 |
| DE | 20 2007 009337 U1 | 11/2008 |
| GB | 2 021 856 A | 12/1979 |

OTHER PUBLICATIONS

Search Report as issued in French Patent Application No. 1761742, dated Jun. 26, 2018.

* cited by examiner

*Primary Examiner* — Patrick F Brinson
(74) *Attorney, Agent, or Firm* — Pillsbury Winthrop Shaw Pittman LLP

(57) ABSTRACT

A method for providing a fluid supply conduit configured to pass through a constrained environment, including providing a circular section tube of appropriate dimensions, die stamping the circular section tube so as to obtain an oblong section tube of oval section, providing a plurality of external stiffeners of hollowed out shape adapted to the external dimensions of the oblong section tube, assembling the external stiffeners around a portion of the section of the oblong section tube.

6 Claims, 2 Drawing Sheets

Fig. 4A
Fig. 4B
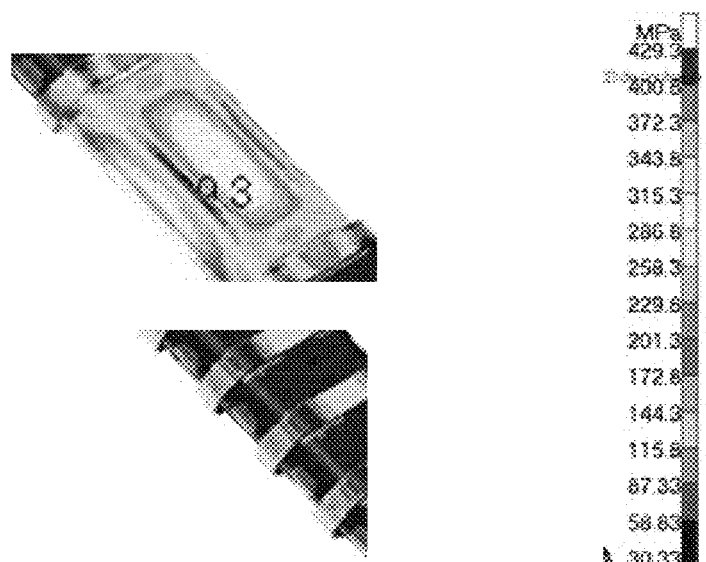
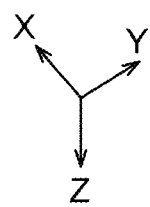
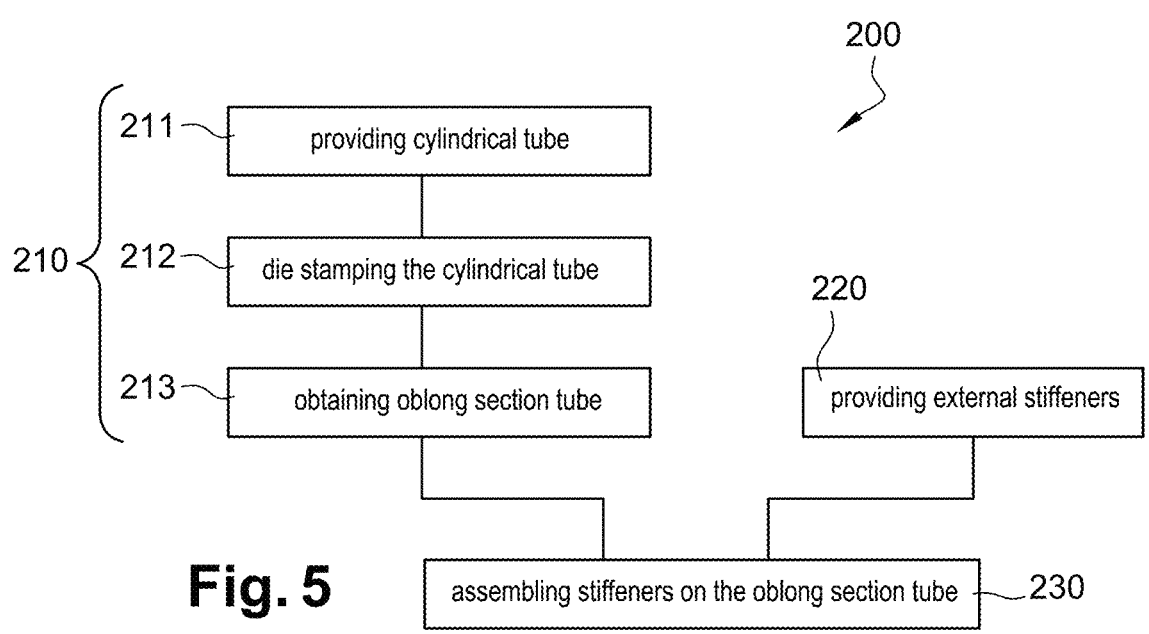
Fig. 5

US 10,774,954 B2

FLUID SUPPLY CONDUIT AND METHOD FOR PROVIDING SUCH A CONDUIT

CROSS-REFERENCE TO RELATED APPLICATIONS

This application claims priority to French Patent Application No. 1761742, filed Dec. 7, 2017, the entire content of which is incorporated herein by reference in its entirety.

FIELD

The present invention relates to a fluid supply conduit suitable for passing through a constrained environment. The invention also relates to a method for providing such a fluid supply conduit. The invention finds applications in all fields with constrained environments such as engine environments and, in particular, in the field of turbojet engines.

BACKGROUND

In constrained environments, such as engine environments, it is known that the transmission of fluids such as gas, oil or fuel may sometimes be difficult to achieve by means of conventional supply conduits formed of one or more round section tubes. Indeed, an engine environment imposes numerous mechanical constraints such as a cramped space, imposed displacements, installation tolerances or instead thermal stresses that prevent the crossing of round section tubes. For these reasons, it is known, in engine environments, to use conduits formed of oval section tubes which have the benefit of offering reduced bulk in one of the dimensions of the tubes. In comparison to a round section tube, and with surface area of equivalent section, the oval geometry of oval section tubes makes it possible to transport a fluid in a restricted space on one axis.

However, oval section tubes, also called oblong section tubes, have an unequal distribution of pressure forces within the tube. Indeed, on account of the disparity of the dimensions of an oblong section tube, the pressure forces are not distributed uniformly over the whole surface of the tube, which generates stresses varying by a factor comprised between 1 and 10 within the tube. Yet, too high stresses in a tube may lead to deterioration or even rupture of the tube.

To compensate this disparity of stresses within an oblong section tube and to consolidate the oblong section tube, certain manufacturers propose inserting each oblong section tube in ring type stiffeners. However, the putting in place of an oblong section tube in ringed stiffeners is complex, in particular in a restricted environment, and thus expensive.

Other manufacturers propose, to compensate the disparity of stresses within an oblong section tube and to consolidate the tube, housing stiffeners—called internal stiffeners—inside the oblong section tube. However, such a solution requires the implementation of a planned cutting method which has the drawback of being particularly expensive. Moreover, the internal stiffeners are positioned in the path of the fluid, which generates head losses.

Another solution proposed by manufacturers is to produce oblong section tubes, the section of which has a variable thickness. Such tubes, manufactured by addition of material, require finishing phases of which the cost is relatively high.

Generally speaking, an oblong section tube may conventionally be formed of a curved metal or alloy plate, the edges of which are welded to each other to form the oblong section tube. Indeed, circular section tubes, called rolled tubes, are welded with a weld bead then the oblong section is obtained by crushing. An oblong section tube may also be formed of two half-shell plates manufactured separately and assembled by welding of the edges together. However, whether there is a single weld or two welds, the welding zone of the edges constitutes a line—or two lines—of least resistance inducing reductions in the mechanical characteristics. The implementation of such oblong section tubes is thus relatively costly.

SUMMARY

To respond to the aforementioned problems of unequal distribution of pressure forces within an oblong section tube, the applicant proposes a supply conduit in which the oblong section tube is partially encircled by a plurality of external stiffeners.

According to a first aspect, the invention relates to a method for providing a fluid supply conduit intended to pass through a constrained environment, the method comprising the following operations:

providing a circular section tube, of appropriate dimensions, die stamping the circular section tube so as to obtain an oblong section tube, providing a plurality of external stiffeners of hollowed out shape adapted to the external dimensions of the oblong section tube, assembling external stiffeners around a portion of the section of the oblong section tube.

This method makes it possible to manufacture independently an oblong section tube and stiffeners such that the stiffeners can be assembled on the oblong section tube at the moment the most suitable for the implementation of the supply conduit.

In the remainder of the description, "substantially oval section" will be understood as a section that has the shape of a closed and lengthened curve, circular at its ends, and of which the aspect has an analogy with an ellipse.

Beneficially, the assembly operation comprises a head to tail positioning of two external stiffeners around the oblong section tube such that the two external stiffeners form an alternating banding around the tube. This alternating banding ensures good resistance to the pressure forces generated by the circulation of fluid within the oblong section tube.

Beneficially, the assembly of the external stiffeners on the oblong section tube is carried out by welding, brazing, bonding or shrink fitting.

According to a second aspect, the invention relates to a fluid supply conduit intended to pass through a constrained environment. This conduit comprises:

at least one oblong section tube having a substantially oval section, and a plurality of external stiffeners of hollowed out shape adapted to encircle the oval section tube over a portion of its section, the plurality of external stiffeners being distributed over a length of the tube.

This supply conduit has the benefit of being less bulky than a conventional cylindrical conduit while having good resistance to pressure forces.

Beneficially, each external stiffener comprises a U-shaped section which enables easy assembly of the stiffener on the oblong section tube by one side of the tube.

The fluid supply conduit may further comprise one or more of the following characteristics:

two successive external stiffeners are positioned head to tail around the oblong section tube such that a pair of the stiffeners forms an alternating banding around the tube;

each external stiffener comprises a variable thickness, the thickness being greater around the most stressed zones of the oblong section tube and thinner around the least stressed zones of the oblong section tube;

the oblong section tube comprising circular zones and linear zones, the thickness of the stiffener increases from a linear zone up to a circular zone.

According to a third aspect, the invention relates to a turbojet engine including a constrained environment traversed by a fluid supply conduit such as defined previously.

BRIEF DESCRIPTION OF THE FIGURES

Other benefits and characteristics of the invention will become clear on reading the description, illustrated by the figures in which:

FIGS. 4A and 4B show a comparison of the state of stress of a supply conduit without external stiffener and with external stiffeners; and FIG. 5 represents an exemplary functional diagram of the method for providing a supply conduit of FIG. 1.

DETAILED DESCRIPTION

An exemplary embodiment of a fluid supply conduit intended to pass through a constrained environment and an example of the method making it possible to manufacture such a conduit are described in detail hereafter, with reference to the appended drawings. These examples illustrate the characteristics and benefits of the invention. It is however recalled that the invention is not limited to these examples.

In the figures, identical elements are marked by identical references. For questions of legibility of the figures, the size scales between the represented elements are not respected.

Figure 1:
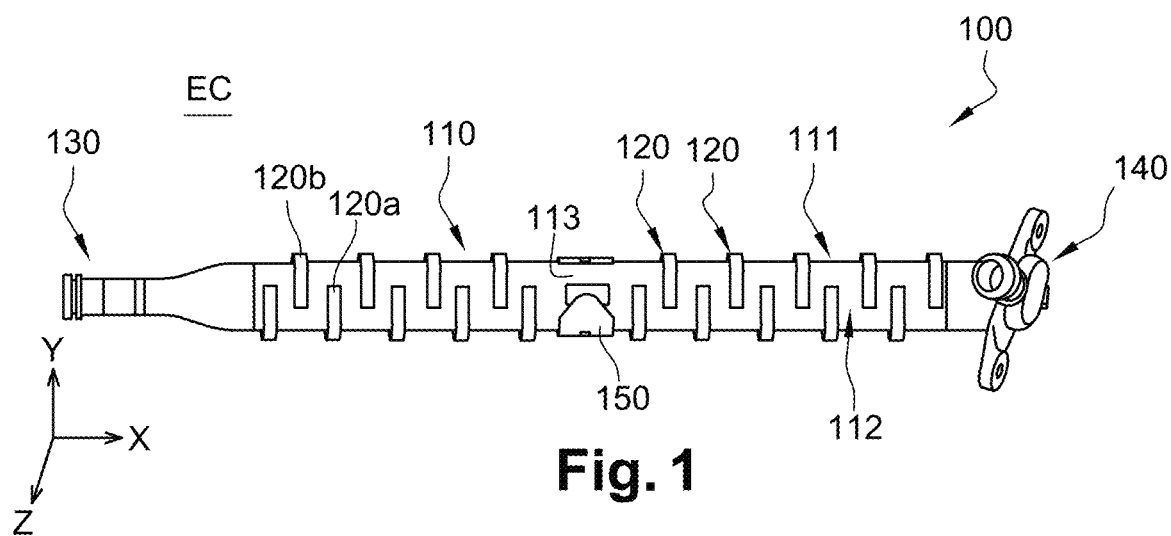
FIG. 1 represents a front view of an example of supply conduit according to an embodiment of the invention.
Figure 2:
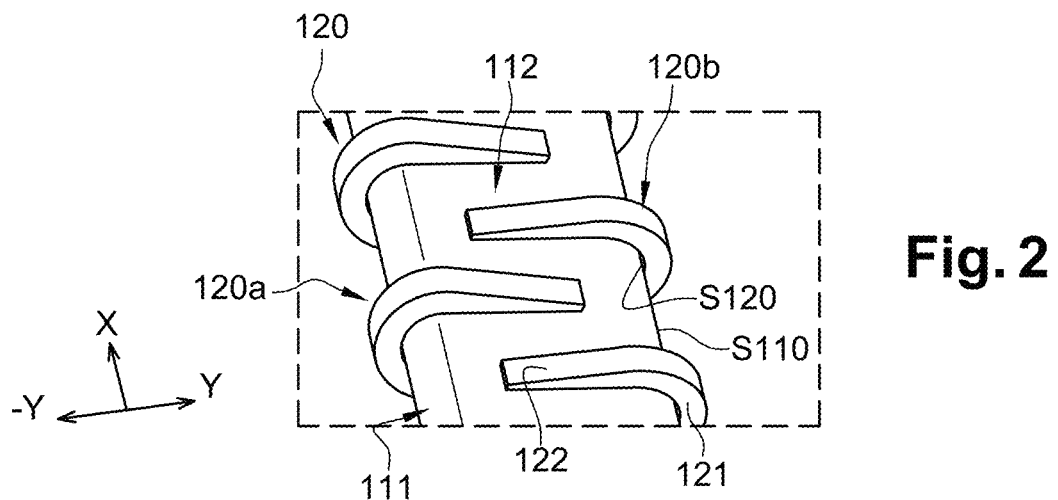
FIG. 2 represents a perspective view of a portion of the supply conduit of FIG. 1.
Figure 3:
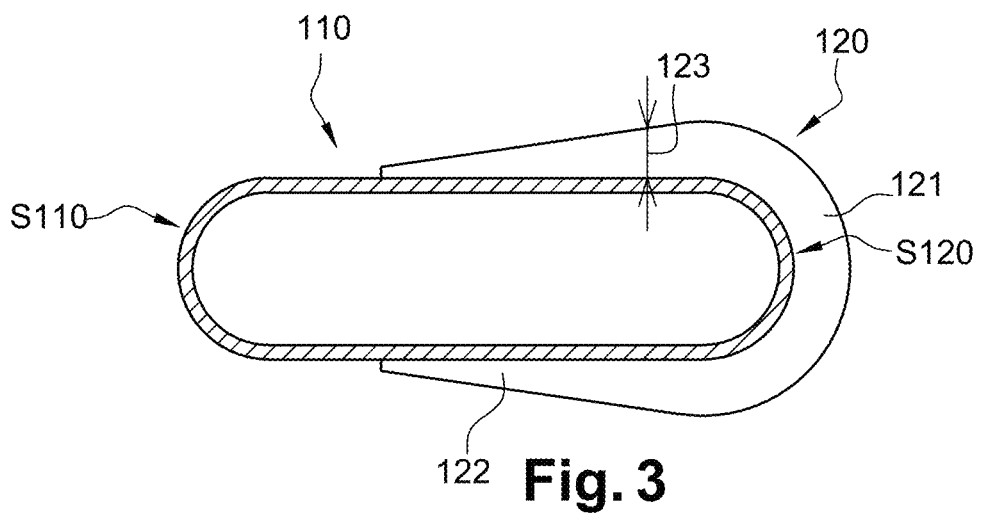
FIG. 3 represents a sectional view of the portion of conduit of FIG. 2.

FIG. 1 represents, according to a front view, an example of fluid supply conduit according to one or more embodiments of the invention. FIG. 2 represents a perspective view of a portion of this conduit. FIG. 3 represents a sectional view of the portion of conduit of FIG. 2.

The supply conduit of FIG. 1, referenced 100, comprises an oblong section tube 110, for example made of metal or alloy, and a plurality of external stiffeners 120. In this example, the supply conduit 100 comprises a single oblong section tube 110. Those skilled in the art will however understand that several oblong section tubes 110 may be laid out one after the other and assembled together by means of joins or any other means of joining tubes. In the example of FIG. 1, the oblong section tube 110 extends into a constrained environment, referenced EC, between an input point of the fluid 140, through which the fluid is introduced into the conduit 100, and an output point of the fluid 130, through which the fluid flows out of the conduit 100.

Between the input 140 and output 130 points, the supply conduit 100 comprises an oblong section tube 110 obtained by die stamping of a circular section tube. Die stamping is a manufacturing technique that consists in forming a part by deforming, after heating or at room temperature, a metal or alloy material. In the invention, a conventional circular section tube is formed, for example hot, in oblong section tube shape by means of a matrix bearing in hollows the shape of the oblong section tube. The oblong section tube 110 obtained by die stamping is a tube in one piece, without welding, which has a substantially oval, or elliptical, section as represented in FIG. 3. Thus, the oblong section tube 110 has a flattened cylinder shape comprising two substantially linear zones 112 extending longitudinally in the plane XY of the constrained environment EC and circular zones 111 extending between the two linear zones 112.

The fact of being weld-free enables the oblong section tube of the invention to not comprise any zone of least resistance due to reductions in mechanical capacities in the welding zones, in comparison with assemblies by welding between edges. The oblong section tube 110 may thus be manufactured with a regular thickness and be relatively thin—for example of the order of 0.6 to 0.9 mm—which makes it possible to limit the bulk of the oblong section tube.

It will be understood that, apart from the thickness of the oblong section tube, the bulk of the oblong section tube 110 may also be modulated by modifying the stretching of the oval of its section.

The fluid supply conduit 100 comprises, in addition to the oblong section tube 110, a plurality of external stiffeners 120 distributed over the length of the oblong section tube 110 and ensuring resistance to high pressures caused by the circulation of the fluid. In the example of FIG. 1, the external stiffeners 120 are distributed over the length of the oblong section tube 110, between the input point 140 and the output point 130, with the exception of a central zone 113 maintained by a fastening device 150. In this example, the fastening device 150 maintains the oblong section tube 110, for example on a wall or on another part of the constrained environment EC, by partially encircling the oblong section tube. The fastening device 150 then plays, locally, in the central zone 113 of the oblong section tube, a role of stiffener.

According to an embodiment of the invention, each external stiffener 120 is mounted outside of the oblong section tube 110 so as to encircle partially the oblong section tube. This external mounting of the oblong section tube makes it possible that the presence of stiffeners does not affect the internal passage section of the tube and thus the flow rate of the fluid within the tube. Each external stiffener 120 has a hollowed out shape, suited to receive a portion of a circular zone 111 of the oblong section tube 110. Thus, each external stiffener 120 may have overall a horseshoe shaped profile encircling at least one part of the circular zone of the oblong section tube 110. In a more precise manner, an external stiffener 120 is a part, for example made of metal or alloy, of which the inner section, referenced S120 in FIGS. 2 and 3, has a shape complementary to the shape of the section S110 of the oblong section tube 110. For example, when the section of the oblong section tube 110 is oval, the inner section S120 is also oval with dimensions such that the inner section of the external stiffener 120 fits together with the external section S110 of the oblong section tube.

The inner section S120 of the external stiffener 120 may have, for example, the shape of a U of which the base 121 surrounds a portion of the circular zone 111 of the oblong section tube 110 and of which the legs 122 follow a portion of the linear zone 112 of the oblong section tube.

A supply conduit according to an embodiment of the invention may be manufactured by producing on the one hand the oblong section tube 110 and on the other hand the external stiffeners 120. As represented in FIG. 5, the provision 210 of the oblong section tube 110 comprises an operation 211 of providing a cylindrical tube, that is to say a conventional tube of circular section, then an operation 212 of die stamping the cylindrical tube in order to obtain an oblong section tube 110 (step 213). Independently of the provision of the oblong section tube 110, the plurality of external stiffeners 120 are manufactured—step 220. These external stiffeners 120 are manufactured by known machining techniques such as milling, wire cutting, laser cutting, foundry by additive or plastic manufacturing/OMC (if low temperatures) so that they each have a horseshoe profile, as explained previously. Such a horseshoe profile of the external stiffeners makes it possible to assemble each stiffener on the oblong section tube—step 230—for example by lateral sliding from the circular zone 111 of the tube. Once mounted around the oblong section tube 110, each external stiffener 120 may be fastened on the tube, for example, by welding, brazing, bonding or shrink fitting. Such an assembly of the external stiffeners on the oblong section tube has the benefit of being compatible with high temperatures.

Such a method 200, in which the external stiffeners are manufactured independently of the oblong section tube and mounted laterally enables late assembly of the two elements, notably assembly after foundry steps. It enables, moreover, a lower failure rate than that of supply conduits with internal stiffeners. This also makes it possible to stiffen a partial oblong zone in the case of a tube where the two ends are circular and the central zone is oblong, which would be impossible to install with a 360° stiffener.

The external stiffeners 120 may have an identical thickness over their whole length. In other words, when they have a U-shape, the legs and the base of the U of each stiffener may be of same thickness. According to certain embodiments, such as those represented in FIGS. 2 and 3, the thickness 123 of some of the external stiffeners, or of all the external stiffeners, may be variable. For example, the thickness 123 of the external stiffeners 120 may be greater around the most stressed zones of the oblong section tube and thinner around the least stressed zones of the oblong section tube. In particular, the thickness 123 of the external stiffeners can increase from the linear zone 112 up to the circular zone 111 of the oblong section tube, the circular zone generally being the zone undergoing the highest stresses.

According to certain embodiments, the external stiffeners 120 are regularly distributed over the length of the oblong section tube 110. According to other embodiments, the external stiffeners are distributed irregularly along the oblong section tube, as a function for example of the parts present in the constrained environment, such as the fastening device 150.

Whether they are distributed regularly or irregularly, the external stiffeners 120 may be positioned by pairs along the oblong section tube 110. Indeed, as represented in FIGS. 1 and 2, two consecutive external stiffeners may be positioned head to tail such that one of the two external stiffeners—for example the stiffener 120a—is oriented towards the direction Y and the other external stiffener—for example the stiffener 120b—is oriented towards the direction-Y. Each pair of external stiffeners—for example the pair 120a, 120b—thereby forms an alternating banding around the oblong section tube 110. Such an alternation of the external stiffeners 120 makes it possible to balance the mechanical stresses of the oblong section tube and, thus, to ensure the resistance of the oblong section tube to high pressures while enabling easy mounting of the stiffeners around the oblong section tube.

FIGS. 4A and 4B show a comparison of the state of stress of a supply conduit without stiffener (FIG. 4A) and a supply conduit according to the invention (FIG. 4B). These figures show that the mechanical stress in the supply conduit of FIG. 4A can rise up to more than 300 MPa, whereas the mechanical stress in the supply conduit of the invention does not exceed 100 MPa.

The oblong character of the tube of the supply conduit of the invention ensures a different flexibility in the different planes (XY, XZ and YZ), which facilitates the putting in place of the conduit in the constrained environment EC, despite the presence of the external stiffeners which slightly increases the flexural rigidity.

Although described through a certain number of examples, alternatives and embodiments, the fluid supply conduit according to the invention includes various alternatives, modifications and improvements which appear in an obvious manner to those skilled in the art, it being understood that these alternatives, modifications and improvements form part of the scope of the invention.

The invention claimed is:

1. A fluid supply conduit configured to pass through a constrained environment, comprising:
   at least one oblong section tube having a substantially oval section, and
   a plurality of external stiffeners of hollowed out shape with a U-shaped section adapted to encircle the oval section tube over a portion of its section, the plurality of external stiffeners being distributed in pairs over a length of said tube, such that two successive external stiffeners of each successive pair are positioned head to tail around the oblong section tube to form an alternating banding around said tube.

2. The fluid supply conduit according to claim 1, wherein each external stiffener comprises a variable thickness, said variable thickness being greater around the most stressed zones of the oblong section tube and thinner around the least stressed zones of the oblong section tube.

3. The fluid supply conduit according to claim 2, wherein the oblong section tube comprises circular zones and linear zones, the variable thickness of the stiffener increases from a linear zone up to a circular zone.

4. A turbojet engine including a constrained environment traversed by a fluid supply conduit according to claim 1.

5. A method for providing a supply conduit according to claim 1, comprising:
   providing a circular section tube of appropriate dimensions;
   die stamping the circular section tube so as to obtain an oblong section tube;
   providing a plurality of external stiffeners of hollowed out shape adapted to the external dimensions of the oblong section tube, and
   assembling the external stiffeners around a portion of the section of the oblong section tube, two successive stiffeners being positioned head to tail around the oblong section tube such that the two successive external stiffeners form an alternating banding around said tube.

6. The method according to claim 5, wherein the assembling of the external stiffeners on the oblong section tube comprises an operation of fastening by welding, brazing, bonding or shrink fitting.

* * * * *